(12) United States Patent
Hu et al.

(10) Patent No.: US 10,852,221 B2
(45) Date of Patent: Dec. 1, 2020

(54) MAGNETIC SUSPENSION THERMOBALANCE BASED ON QUICK PHOTOTHERMAL HEATING AND MEASUREMENT METHOD THEREOF

(71) Applicant: HUAZHONG UNIVERSITY OF SCIENCE AND TECHNOLOGY, Hubei (CN)

(72) Inventors: Song Hu, Hubei (CN); Hanjian Li, Hubei (CN); Jun Xiang, Hubei (CN); Huanying Chi, Hubei (CN); Gongxiang Song, Hubei (CN); Tao Liu, Hubei (CN); Sheng Su, Hubei (CN); Yi Wang, Hubei (CN); Kai Xu, Hubei (CN); Limo He, Hubei (CN); Jun Xu, Hubei (CN); Hengda Han, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 16/759,361

(22) PCT Filed: Nov. 9, 2018

(86) PCT No.: PCT/CN2018/114832
§ 371 (c)(1),
(2) Date: Apr. 27, 2020

(87) PCT Pub. No.: WO2019/196401
PCT Pub. Date: Oct. 17, 2019

(65) Prior Publication Data
US 2020/0292432 A1 Sep. 17, 2020

(30) Foreign Application Priority Data

Apr. 11, 2018 (CN) .......................... 2018 1 0320916
Apr. 11, 2018 (CN) .......................... 2018 1 0321659

(51) Int. Cl.
*G01N 5/04* (2006.01)
*G01B 11/02* (2006.01)
(Continued)

(52) U.S. Cl.
CPC ............. *G01N 5/04* (2013.01); *G01B 11/026* (2013.01); *G01G 7/02* (2013.01); *G01G 21/23* (2013.01); *G01G 23/16* (2013.01); *G01N 25/00* (2013.01)

(58) Field of Classification Search
USPC ............................................ 374/14; 436/908
See application file for complete search history.

(56) References Cited

U.S. PATENT DOCUMENTS 3,469,455 A * 9/1969 Shigeo ...................... G01G 1/00
73/865.6
4,817,745 A * 4/1989 Beshoory ................. G01G 7/00
177/212
(Continued)

FOREIGN PATENT DOCUMENTS

CN 2490570 Y * 5/2002
CN 101082517 12/2007
DE 3807212 A1 * 9/1989 ............... G01G 7/02

OTHER PUBLICATIONS

Linseis, Thermal Analysis & Thermo Physical Properties, p. 15 (Year: 2016).*
(Continued)

*Primary Examiner* — David L Singer
(74) *Attorney, Agent, or Firm* — JCIP Global Inc.

(57) ABSTRACT

A magnetic suspension thermobalance based on quick photothermal heating comprises a sealed container, a reaction tank, a magnetic suspension device, a laser displacement monitoring component, a photothermal heating component and a photothermal heating component displacement device. A method comprises following steps: weighing a testing
(Continued)

sample and adding same into the reaction tank; putting the reaction tank into the sealed container together with a magnetic suspension float; causing the magnetic suspension float to float in the sealed container; introducing gas into the sealed container; measuring the real-time position of the magnetic suspension float, and causing same to a measurement zero point; heating the reaction tank; maintaining a heating beam on the reaction tank; measuring the temperature of the testing sample in the reaction tank; and recording the displacement of the magnetic suspension float, and converting said displacement into mass.

17 Claims, 4 Drawing Sheets

(51) Int. Cl.
*G01G 7/02* (2006.01)
*G01G 23/16* (2006.01)
*G01G 21/23* (2006.01)
*G01N 25/00* (2006.01)

(56) References Cited

U.S. PATENT DOCUMENTS

2006/0140246 A1* 6/2006 Danley ................. G01G 19/52
374/14
2014/0230577 A1* 8/2014 Cakmak ................. G01B 11/06
73/863.11

OTHER PUBLICATIONS

Rubotherm Series IsoSORP® Sorption Analyzer (Year: 2018).*
"International Search Report (Form PCT/ISA/210) of PCT/CN2018/114832", dated Jan. 30, 2019, with English translation thereof, pp. 1-5.

* cited by examiner

MAGNETIC SUSPENSION THERMOBALANCE BASED ON QUICK PHOTOTHERMAL HEATING AND MEASUREMENT METHOD THEREOF

CROSS-REFERENCE TO RELATED APPLICATION

This application is a 371 of international application of PCT application serial no. PCT/CN2018/114832, filed on Nov. 9, 2018, which claims the priority benefit of China applications no. 201810321659.5 and no. 201810320916.3, filed on Apr. 11, 2018. The entirety of each of the above mentioned patent applications is hereby incorporated by reference herein and made a part of this specification.

BACKGROUND

Technical Field

The disclosure relates to a magnetic suspension thermobalance, and in particular, to a magnetic suspension thermobalance based on quick photothermal heating and a measurement method thereof.

Description of Related Art

The thermal gravimetric analysis is a thermal analysis technique that measures the relationship between the mass of a sample to be measured and the temperature change under a program-controlled temperature and is configured to study the thermal stability and composition of materials. The main instrument used in the thermal gravimetric analysis is a thermobalance.

A mechanical structure is usually adopted by a conventional thermobalance and is mainly formed by a recording balance, a balance heating furnace, a program temperature control system, and a recorder. Herein, the basic principle of balance recording is to convert balance displacement caused by a change in sample mass into electricity. Such small amount of electricity is sent to the recorder for recording after being amplified by an amplifier. Since the amount of electricity is proportional to the mass change of the sample, the mass change of the sample is accordingly obtained. Nevertheless, such mechanical thermobalance becomes less and less able to meet complicated experimental conditions used in modern analytical testing such as high temperature, high heating rate, high pressure, corrosive atmosphere, and so on.

Chinese patent application number CN200620127972.8 discloses a high temperature thermobalance, which adopts a simple structure in which a balance sample is suspended and connected in a vertical pipe-type resistance furnace, but influences brought by airflow and temperatures are not taken into account. Chinese patent application number CN200910243952.5 discloses a method for controlling reaction gas channeling of a thermobalance analyzer and a pressurized thermobalance analyzer for preventing reaction gas channeling by adding an isolation member based on the former. Nevertheless, a complicated instrument structure is provided, and moreover, since the balance and a reactant share the same chamber, measurement precision and application ranges may be affected to some extent. Chinese patent application number CN201010104591.9 discloses a controllable fast-heating up thermobalance reacting furnace in which a sample is pushed into a lifting device to implement fast heating. Nevertheless, unknown actual heating rate and jiggling in the lifting process may both affect the measurement result. Chinese patent application number CN201010590839.7 discloses a thermobalance with a controllable high heating rate in which a material is heated by a double-layer metallic wire-mesh through a wire-mesh reaction system, and the maximum heating rate is 1000° C./s. Nevertheless, for a thermobalance applying such heating manner, temperature is considerably required to be controlled as affected by the heat flux density changes and hysteresis of the temperature regulation effect caused by heat retention in the electrothermal heating manner from the cold state to the hot state. Chinese patent application number CN201210501784.7 discloses a microwave heating mass detection device capable of heating a material rapidly by adopting a microwave heating manner. Nevertheless, different materials absorb different levels of microwave, and as such, the heating rate may be difficult to be controlled, and a thermobalance may be less suitable to such manner.

In the existing commercial products, regardless of an atmospheric pressure thermobalance or a high pressure thermobalance, an electric furnace is still adopted for heating, and the fastest heating rate is merely 50 to 100K/min in such a conventional heating manner. The pressure and atmosphere of the test is considerably limited in the balance measurement manner of mechanical connection, and moreover, a severe system error may also be generated, and measurement precision is thereby affected.

A pull-down magnetic suspension system is adopted by the magnetic suspension-type thermogravimetric analyzer provided by the German company Rubotherm, and through which, thermal gravimetric analysis becomes possible under ultra-high pressure and corrosive atmosphere. Nevertheless, the conventional measurement manner used by a thermobalance of converting displacement of an external stator end into electricity is still adopted. Zero adjustment is significantly slow under different operating conditions, and disturbances during the measurement process also produce much more noise than the conventional mechanical connection manner. Furthermore, applications of the magnetic suspension thermogravimetric analyzer of this type are limited because of the slow heating speed provided by the conventional electric furnace heating.

SUMMARY

The disclosure provides a magnetic suspension thermobalance based on quick photothermal heating and a measurement method thereof for implementing high-precision measurement of a mass change of a testing sample under a temperature control condition.

To implement the above purpose, a magnetic suspension thermobalance based on quick photothermal heating provided by the disclosure includes a sealed container, a reaction tank, a magnetic suspension device, a laser displacement monitoring component, a photothermal heating component and a photothermal heating component displacement device. A gas inlet is disposed on an upper end of the sealed container, a removable cover plate is disposed on a lower end of the sealed container, and a gas outlet is disposed on the cover plate. An air flow stabilization device and an infrared temperature measurement component are disposed inside the sealed container. A displacement monitoring window and a heating beam window both made of a transparent material are disposed in a side wall of the sealed container. The air flow stabilization device is fixed below the gas inlet, and the infrared temperature measurement component is fixed below the air flow stabilization device. The photothermal heating component and the laser displacement monitoring component are disposed around the sealed container. The photothermal heating component is connected to the photothermal heating component displacement device and is displaceable through the photothermal heating component displacement device. The laser displacement monitoring component is disposed outside the sealed container. The magnetic suspension device comprises a magnetic suspension float and a magnetic suspension stator. A support stand configured to support the reaction tank is fixedly disposed on an upper portion of the magnetic suspension float. The support stand may also isolate heat of the reaction tank and prevent a magnetic property of the magnetic suspension stator from being affected by a high temperature. The support stand may also be integrated on the magnetic suspension float. When measurement is performed, the magnetic suspension stator is located below the cover plate, and the reaction tank is placed on the support stand and is placed inside the sealed container together with the magnetic suspension float. The reaction tank, the magnetic suspension float, and the magnetic suspension stator are all located on a same center axis. The infrared temperature measurement component faces an opening on an upper portion of the reaction tank. A heating beam emitted by the photothermal heating component passes through the heating beam window and focuses on the reaction tank. A monitoring laser beam emitted by the laser displacement monitoring component may pass through the displacement monitoring window and irradiates a measurement position of the magnetic suspension float. The measurement position is selected according to needs of the laser displacement monitoring component, and is preferably located on a bottom surface of the magnetic suspension float.

Operation Principles. Displacement of the magnetic suspension float in a magnetic field formed by the magnetic suspension stator in a heating process is measured by the device, so as to calculate a mass change of a testing sample according to the displacement. Moreover, a real-time temperature of the testing sample is measured through the infrared temperature measurement component, and that experimental data required by a thermal gravimetric analysis is obtained. The mass change of the testing sample may also be determined through a comparative test before the experiment. That is, a standard sample is adopted, and a test is performed under a condition that cold-state mass (weighed by another analytical balance) and a velocity of flow are identical. A displacement-mass change curve is obtained, and the mass change of the testing sample is obtained according to the curve.

Preferably, the magnetic suspension thermobalance further includes a stator lifting and lowering component, an upper portion of the stator lifting and lowering component is fixedly connected to a lower portion of the magnetic suspension stator, and the magnetic suspension stator may be lifted and lowered. As the stator lifting and lowering component is accordingly disposed, automatic control and recording of the position of the magnetic suspension stator is implemented.

Preferably, the stator lifting and lowering component includes an electric machine and a screw pair. One end of the screw pair performing a rotation motion is fixedly connected to an output axis of the electric machine, and another end of the screw pair performing a linear motion is fixedly connected to the lower end of the magnetic suspension stator.

Preferably, a balancer is disposed outside the magnetic suspension float. An upper portion of the balancer is fixedly connected to the support stand, and the upper portion of the magnetic suspension float is embedded inside the balancer from bottom to top. A least two balancing wings are symmetrically disposed on a center of the balancer. The balancing wings adopt a simple wing-shaped and may drive the magnetic suspension float and the reaction tank to slowly rotate when air flow is evenly provided. Arrangement of the balancer may reduce influences brought by gas disturbance on the reaction tank, and moreover, the testing sample inside the reaction tank is ensured to be evenly heated.

Preferably, a number of the photothermal heating component is plural, the photothermal heating components surround the center axis of the reaction tank and are disposed in an array outside the sealed container. A size and a number of the heating beam window are determined to ensure that each of the photothermal heating components normally irradiates the reaction tank in a measurement process.

Preferably, a number of the laser displacement monitoring component is plural, the laser displacement monitoring components are disposed around the center axis of the reaction tank in an array outside the sealed container. A size and a number of the displacement monitoring window are determined to ensure that each of the laser displacement monitoring components normally irradiates the measurement position of the magnetic suspension float in a measurement process. The plurality of laser displacement monitoring components disposed in an array may feedback the positions and states of the magnetic suspension float and the reaction tank in space in real time. On the one hand, an error brought by shift of centers of gravity of the magnetic suspension float and the reaction tank caused by gas or heat disturbance in the magnetic field position during measurement may be eliminated. As such, an error of measurement of a sample quality change performed by a system is decreased, and precision and reliability of the thermobalance during measurement is improved. On the other hand, the states of the magnetic suspension float and the reaction tank may be fed back in real time. As such, the photothermal heating component or an external gas inlet component or gas outlet component is introduced to be slightly adjusted, or shutting down and error reporting is introduced to be performed, so that measurement precision and security is further improved.

Preferably, the sealed container is cylindrical-shaped, and the reaction tank, the magnetic suspension float, and the magnetic suspension stator are all located on a center axis of the sealed container when measurement is performed.

Preferably, a precision robotic arm is adopted for the photothermal heating component displacement device. The precision robotic arm may drive the photothermal heating component to implement fast large-area mechanical movement such as translation, rotation, and twist, and a complicated and precise heating process is implemented together with power control of a heating light source. According to a shift message of the reaction tank fed back by the laser displacement monitoring components, the precision robotic arm may be further controlled in real time through a computer. Automatic tracing of the position of the reaction tank is implemented, and the specific control method may adopt control performed by a conventional server.

Preferably, the photothermal heating component includes a heating light source and an optical component configured to focus the heating light source.

Preferably, a pressure monitoring component is further disposed inside the sealed container. The function of the pressure monitoring component includes monitoring a pressure inside the device in real time, satisfying pressure test requirements under different pressure experiment conditions, and monitoring system security.

Preferably, a microscope and/or a Raman laser is further disposed in the sealed container, and an installation position thereof is determined to facilitate measurement. Recording and detecting of related properties of an image may be implemented in real time through installation of added detection devices such as the microscope and the Raman laser.

In the disclosure, preferable materials of the various parts are selected as follows.

Fiber reinforced plastics is adopted to make the sealed container. The fiber reinforced plastic material is cheap and exhibits advantages of high pressure resistance, corrosion resistance, and chemical stability, and therefore, meets the experimental needs of the sealed container. As such, component costs may be effectively lowered.

High-transmittance quartz glass is preferably adopted to make both the displacement monitoring windows and the heating beam windows. The high-transmittance quartz glass exhibits not only favorable chemical stability and pressure resistance but also favorable transmittance for visible and infrared light, so that the heating beam of the photothermal heating component and the monitoring laser beam of the laser displacement monitoring component may effectively pass through. Arrangement of windows respectively disposed for heating and monitoring may also effectively prevent the heating beam from affecting the laser displacement monitoring component.

The magnetic suspension float is preferably made of a permanent magnet material, such as samarium cobalt magnet, iron chromium cobalt, aluminum nickel cobalt, and the like.

The reaction tank is preferably made of a material featuring high light and heat absorption rate, good thermal conductivity, high temperature resistance, and chemical inertness, and such material may specifically be silicon carbide, silicon nitride, silicon, graphite, and the like. The reaction tank is more preferably a black silicon carbide ceramic cylindrical crucible exhibiting characteristic stability, high temperature resistance, corrosion resistance, good thermal conductivity, and the like. The black color of the material itself may effectively absorb the heating beam of the photothermal heating component, so that differences caused by different material characters such as colors and structures are prevented during the photothermal heating process.

A lightweight insulating brick material is adopted to make the support stand and the balancer. The use of such lightweight insulating brick material (e.g., asbestos brick and high alumina brick) may effectively block thermal conductivity between the reaction tank and the magnetic suspension float, and the region irradiated by the beam may also be effectively isolated from the magnetic suspension float.

Preferably, surfaces of the support stand, the balancer, and the magnetic suspension float are sprayed with a high temperature and corrosion resistant coating. The high temperature and corrosion resistant coating may further protect the support stand, the balancer, and the magnetic suspension float.

Preferably, a highly efficient photothermal heating light source having a light concentration cup is adopted for the heating light source, and the optical component is a lens group having an infrared anti-reflection coating.

The disclosure further provides a measurement method of a magnetic suspension thermobalance based on quick photothermal heating, and the measurement method adopts the aforementioned magnetic suspension thermobalance to measure a mass change of a testing sample under a temperature control condition and includes following steps.

1) The testing sample having a mass of $g_0$ is weighed and the same is added into the reaction tank.

2) The cover plate is removed, the reaction tank is placed on the support stand of the magnetic suspension float, the magnetic suspension float is placed on a center of the cover plate, the cover plate is installed onto the sealed container, and a position of the magnetic suspension stator is adjusted to be located directly below the center of the installed cover plate.

3) The magnetic suspension device is activated, the magnetic suspension stator is moved upwards after a magnetic field stabilizes, so that the magnetic suspension float floats in the sealed container.

4) Gas required to maintain a reaction atmosphere is continuously introduced into the sealed container, the gas enters from the gas inlet and exits from the gas outlet, and a velocity of flow of the gas is controlled to be a velocity of flow v required by a test.

5) The laser displacement monitoring component is activated, the monitoring laser beam emitted by the laser displacement monitoring component passes through the displacement monitoring window, irradiates the measurement position of the magnetic suspension float, and measures a real-time position of the magnetic suspension float in the sealed container, and the position of the magnetic suspension stator is adjusted up and down, causing the magnetic suspension float to float to a measurement zero point position (the position may be adjusted according to needs) of the laser displacement monitoring component.

6) The photothermal heating component is activated, and the heating beam emitted by a heating light source of the photothermal heating component passes through the heating beam window, focuses on the reaction tank, and heats the reaction tank.

7) The magnetic suspension float is caused to displace by the mass change of the testing sample in a temperature control process (including temperature increasing and decreasing), displacement is measured by the laser displacement monitoring component in real time, a position of the photothermal heating component is adjusted in real time by the photothermal heating component displacement device according to the displacement, and the heating beam is kept on the reaction tank all the time.

8) A real-time temperature of the testing sample is measured in the reaction tank through the infrared temperature measurement component, heating power of a heating light source is adjusted according to the measured real-time temperature, and precise temperature control of the testing sample is implemented.

9) Displacement of the magnetic suspension float relative to the measurement zero point in the temperature control process is recorded, and corresponding mass is obtained according to the converted displacement.

In the magnetic suspension thermobalance designed by the disclosure, a certain functional relationship between mass (or its change) and displacement is provided, and the functional equation is: $g_t=f(\Delta,v,g_0,x_t)$. Herein, $\Delta$ is a coefficient related to the magnetic suspension device, and when adjustment of the magnetic suspension system is completed, $\Delta$ may be treated as a setting value. As such, the abovementioned functional equation may be simplified to: $g_t=f(v,g_0,x_t)$, $g_t$ is a mass of the testing sample at time t when the experiment begins, $g_0$ is the mass of the testing sample before heating and is called as cold mass or initial mass in the disclosure, v is a controlled velocity of flow of gas in the experiment, and $x_t$ is displacement of the testing sample relative to the measurement zero point at the time t. Since v and $g_0$ are setting values in a single experiment, $g_t$ is merely related to $x_t$. The specific functional relationship may be calculated theoretically based on the magnetic field distribution and may also be calibrated by measuring a standard material of which a temperature-mass curve is known.

Preferably, the displacement measured in the experiment is converted into mass through a comparative experiment in step 9), and the comparative experiment includes following steps. 9.1) A plurality of mass values close to the initial mass of $g_0$ are evenly selected, and herein, a maximum mass value is greater than or equal to a maximum value of the mass of the testing sample in the temperature control process, and a minimum mass value is less than or equal to a minimum value of the mass of the testing sample in the temperature control process. 9.2) A comparative sample having mass of $g_t$ is weighed and added into the reaction tank to perform the comparative experiment for each of mass values $g_t$, various parameters of the magnetic suspension device are kept to be identical to that in an experiment performed for the testing sample, the velocity of flow v of the gas and the position of the magnetic suspension stator are adjusted to be identical to that in the experiment performed for the testing sample, the photothermal heating component is not activated, and the displacement $x_t$ corresponding to the mass $g_t$ is recorded. 9.3) Each of the obtained mass values is experimented according to the foregoing steps, a data table of displacement $x_t$ and mass $g_t$ is obtained, and a $x_t$-$g_t$ curve is drawn. 9.4) A point of the displacement obtained through measurement on the $x_t$-$g_t$ curve is identified when the testing sample is experimented, and that the corresponding mass is obtained.

Preferably, a plurality of groups of $g_0$ and v for the comparative experiment are obtained according to a numerical range required by the experiment. The position of magnetic suspension stator is first adjusted and the magnetic suspension float is caused to float to the set measurement zero point position for each group of $g_0$ and v, and the magnetic suspension stator is kept to be unchanged next. Comparative data of $x_t$ and $g_t$ under a condition of $g_0$ and v according to steps 9.1) to 9.3) is obtained. The comparative experiment is repeatedly performed, and a data base including four quantities of $g_0$, v, $x_t$, and $g_t$ is established. When the testing sample is experimented, one group of $g_0$ and v is selected according to needs, and the comparative data of the corresponding $x_t$ and $g_t$ in the data base is identified, so that displacement is conveniently converted into mass.

Preferably, in step 9.4), curve fitting is performed to the $x_t$-$g_t$ curve, and an equation of $g_t$ and $x_t$ is obtained, and the displacement obtained through measurement is substituted into the equation when the testing sample is tested, and that the corresponding mass is obtained.

Preferably, the method further includes following steps. 10) The real-time temperature of the testing sample in the temperature control process is recorded and corresponded with the mass calculated and obtained in real time in step 9), and a curve of the mass of the testing sample and a temperature is drawn to perform a thermal gravimetric analysis.

Preferably, the method further includes following steps. 11) The magnetic suspension stator is moved downwards and the magnetic suspension float is caused to slowly descend onto the cover plate after the sample tank is cooled down after the measurement is completed, a system power source is turned off, the cover plate is opened, and the reaction tank is removed.

Preferably, an air flow stabilization device is disposed inside the sealed container. The air flow stabilization device is fixed below the gas inlet, and the infrared temperature measurement component is fixed at a center of a lower portion of the air flow stabilization device.

Preferably, the measurement position is selected according to needs of the laser displacement monitoring component, and is preferably located on a bottom surface of the magnetic suspension float.

Compared to the related art, advantages of the disclosure lies as follows.

1) Shift of the magnetic suspension float in the horizontal direction may be well restricted by adopting the push-up type magnetic suspension float manner without the need for a stabilizer.

2) The temperature of the testing sample may be precisely represented through adoption of the non-contact infrared temperature measurement manner without affecting the reaction tank.

3) The light concentration-type photothermal heating component may concentrate heat in a heated region of the reaction tank without heating other regions, so that the magnetic property of the magnetic suspension float is prevented from being affected by temperatures. Moreover, not all devices are required to be in the high-temperature and high-pressure state when the devices are under the condition of high pressure, so that the experimental process may be performed stably and safely.

4) Displacement of the magnetic suspension float relative to the mass change of the testing sample is directly measured, so that possibility of an system error caused by an existing magnetic suspension thermobalance when converting a mechanical variable into displacement and then into electricity is lowered, and measurement precision is thereby ensured.

5) Along with gas composition, pressure control, and detection means, the thermal gravimetric analysis and situ reaction monitoring on different temperatures (including high temperatures), different pressures (including high pressures), different heating rates (including fast heating), and special atmosphere (including corrosive atmosphere) may be implemented.

6) Protective gas required by a conventional thermobalance for maintaining stability of the mass measurement component is not needed, so that system complexity is lowered.

7) The detailed comparative experiment provided may not only satisfy the needs for mass measurement but may also act as a reference experimental process for determining whether an experiment is abnormal, and that system security is further improved.

DESCRIPTION OF THE EMBODIMENTS

Figure 1:
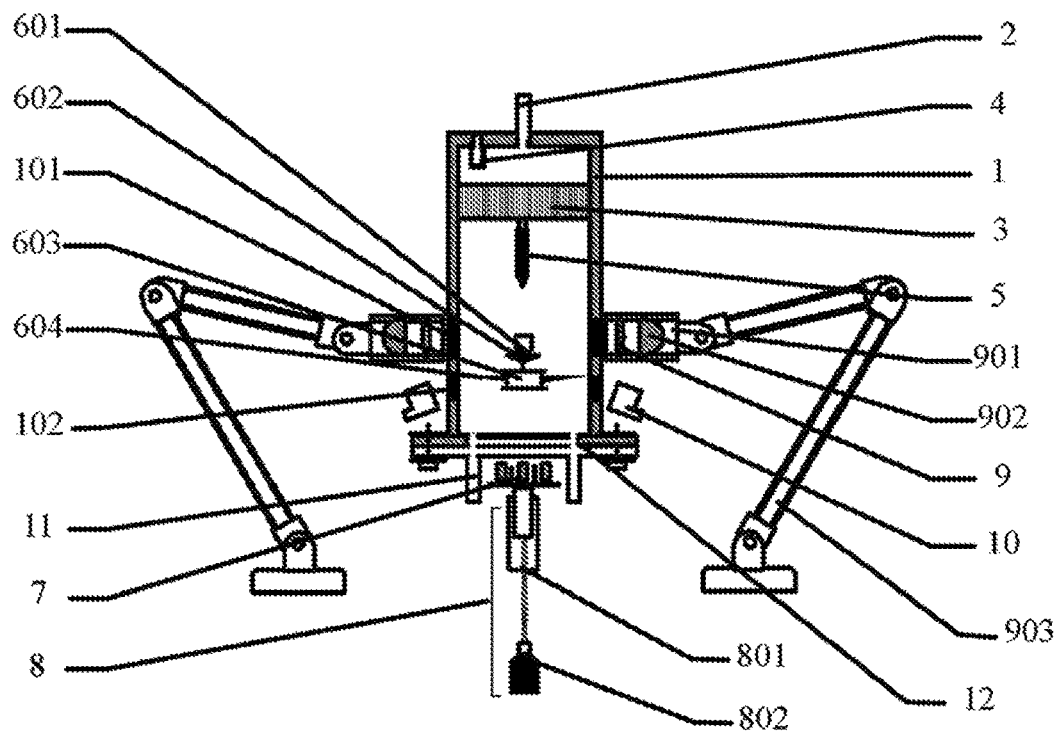
FIG. 1 is a schematic cross-sectional view of a structure of a magnetic suspension thermobalance based on quick photothermal heating designed by an embodiment 1.
Figure 2:
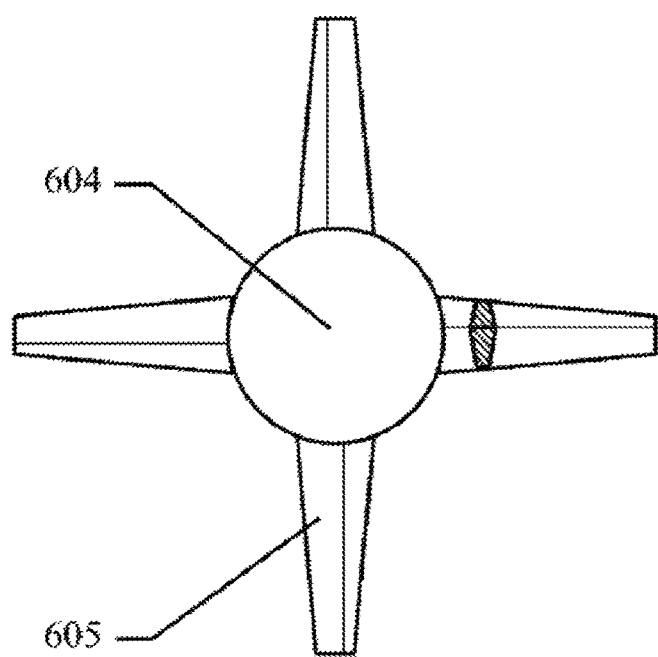
FIG. 2 is a schematic top view of a structure of a balancer in FIG. 1.
Figure 3:
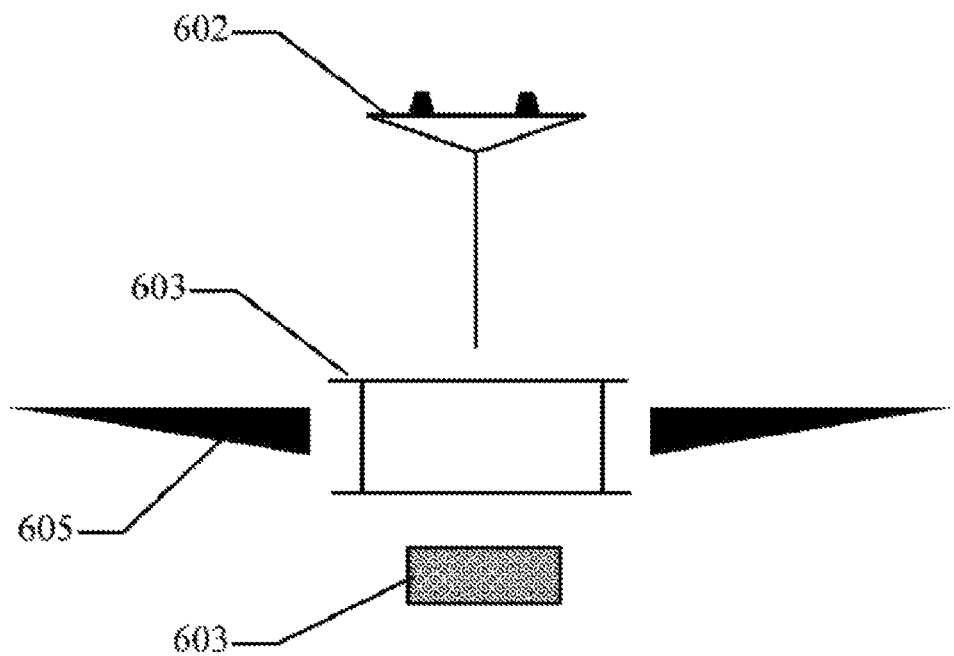
FIG. 3 is a schematic exploded view of a structure of a magnetic suspension float in FIG. 1.
Figure 4:
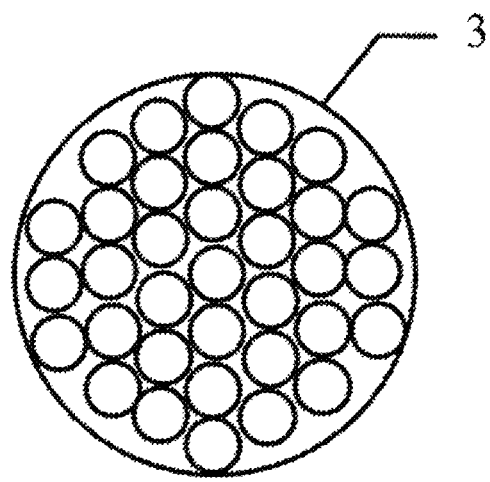
FIG. 4 is a schematic top view of a structure of an air flow stabilization device in FIG. 1.

The disclosure is further described in detail in combination with accompanying drawings and specific embodiments.

Embodiment 1

As shown in FIG. 1 to FIG. 4, a magnetic suspension thermobalance based on quick photothermal heating designed by this embodiment includes a sealed container 1, a reaction tank 601, a magnetic suspension device 6, a stator lifting and lowering component 8, a laser displacement monitoring component 10, a photothermal heating component 9 and a photothermal heating component displacement device 903.

The sealed container 1 is cylindrical-shaped, a gas inlet 2 is disposed on a center of an upper end of the sealed container 1, and a removable cover plate 12 (secured through a bolt) is disposed on a lower end of the sealed container 1. Two gas outlets 11 are symmetrically disposed on the cover plate 12. In the sealed container 1, a pressure monitoring component 4, an air flow stabilization device 3, and an infrared temperature measurement component 5 are disposed inside, and a displacement monitoring window 102 made of a transparent material and a heating beam window 101 made of a transparent material are disposed in a side wall. The air flow stabilization device 3 is fixed below the gas inlet 2 and is a honeycomb briquet-shaped porous structure. The infrared temperature measurement component 5 is fixed at a lower center position of the air flow stabilization device 3, and a measurement direction is directly below. A precision robotic arm is adopted for the photothermal heating component displacement device 903 and may be controlled in real time through a computer. The photothermal heating component 9 is disposed on and may be displaced along with the photothermal heating component displacement device 903.

The magnetic suspension device 6 includes a magnetic suspension float 603 and a magnetic suspension stator 7, and a support stand 602 configured to support the reaction tank 601 is fixedly disposed on an upper portion of the magnetic suspension float 603. The stator lifting and lowering component 8 includes an electric machine 802 and a screw pair 801. One end of the screw pair 801 performing a rotation motion is fixedly connected to an output axis of the electric machine 802, and another end of the screw pair 801 performing a linear motion is fixedly connected to the lower end of the magnetic suspension stator 7. A balancer 604 is disposed outside the magnetic suspension float 603, and at least four balancing wings 605 are disposed outside the balancer 604 in a circumferential direction in an array. An upper portion of the balancer 604 is fixedly connected to the support stand 602, and the upper portion of the magnetic suspension float 603 is embedded inside the balancer 604 from bottom to top.

The magnetic suspension stator 7 is located below the cover plate 12, and the reaction tank 601 is placed on the support stand 602 and is placed inside the sealed container 1 together with the magnetic suspension float 603. The reaction tank 601, the magnetic suspension float 603, and the magnetic suspension stator 7 are all located on the center axis (a vertical direction) of the sealed container 1 when measurement is performed. The air flow stabilization device 3 fitted and disposed below may be used to ensure that air flow is evenly and stably provided. The pressure monitoring component 4 is disposed a top portion of the container body, and a temperature monitoring component is fixedly connected and disposed below a middle portion of the air flow stabilization device 3 and directly faces the reaction tank 601.

The photothermal heating component 9 includes a heating light source 901 and an optical component 902 configured to focus the heating light source 901. A number of the photothermal heating component 9 and a number of the heating beam window 101 are respectively 2, and the photothermal heating components 9 and the heating beam windows 101 surround the center axis of the reaction tank 601 and are disposed at two sides of the sealed container 1. A size and a position of each of the heating beam windows 101 are determined to ensure that each of the photothermal heating components 9 may normally irradiate the reaction tank 601 in a measurement process.

A number of the laser displacement monitoring component 10, and a number of the displacement monitoring window 102 are respectively 2, and the laser displacement monitoring components 10 and the displacement monitoring windows 102 are symmetrically disposed at two sides of the sealed container 1. The laser displacement monitoring components 10 and the displacement monitoring windows 102 are located below the photothermal heating components 9. A size and a number of each of the displacement monitoring windows 102 are determined to ensure that each of the laser displacement monitoring components 10 normally irradiates a measurement position of the magnetic suspension float 603 in a measurement process. A bottom surface of the magnetic suspension float 603 is selected as the measurement position in this embodiment.

Fiber reinforced plastics is adopted to make the sealed container 1 and the cover plate 12. High-transmittance quartz glass is adopted to make both the displacement monitoring windows 102 and the heating beam windows 101. A black silicon carbide ceramic cylindrical crucible is adopted for the reaction tank 601. A lightweight insulating brick material is adopted to make the support stand 602 and the balancer 604. Surfaces of the support stand 602, the balancer 604, and the magnetic suspension float 603 are sprayed with a high temperature and corrosion resistant coating. A samarium cobalt magnet is adopted to make the magnetic suspension float 603. A highly efficient photothermal heating light source 901 having a light concentration cup is adopted for the heating light source 901. The optical component 902 is a lens group having an infrared anti-reflection coating.

In this embodiment, the Fluke 572-2 is adopted for the infrared temperature measurement component 5, the Panasonic HG-C1100 is adopted for the laser displacement monitoring component 10, and the Osram HLX64635 is adopted for the heating light source 901.

Embodiment 2

Figure 5:
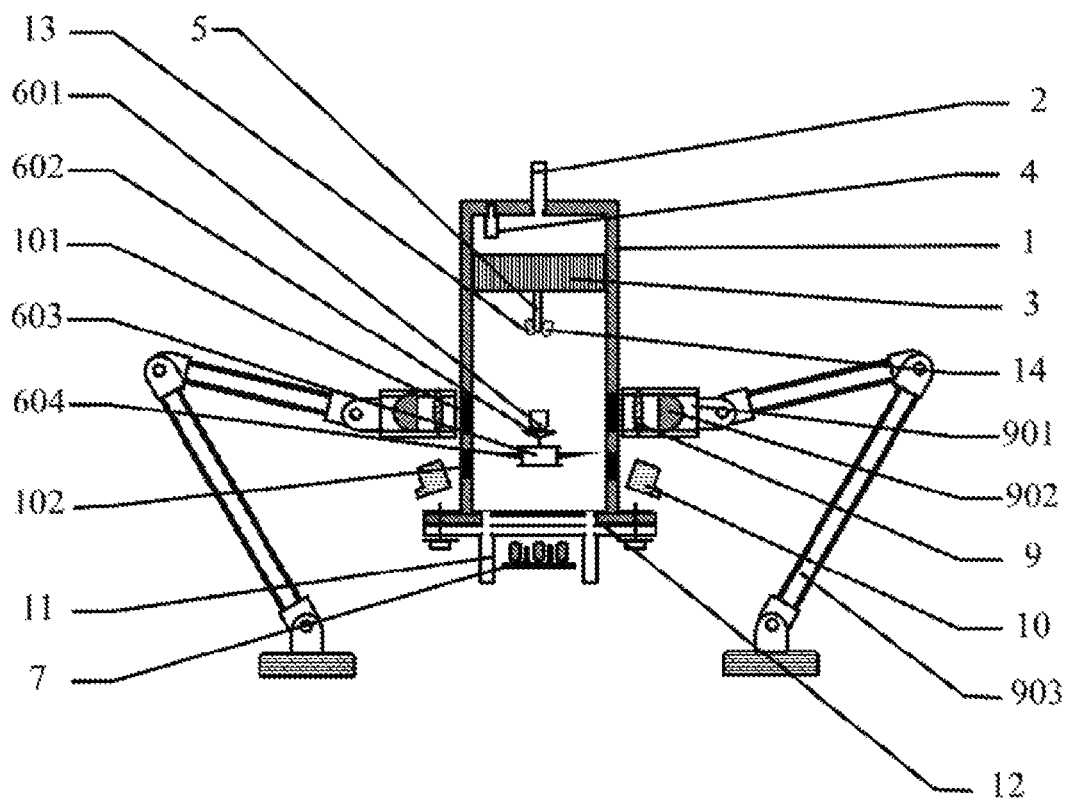
FIG. 5 is a schematic cross-sectional view of a structure of a magnetic suspension thermobalance based on quick photothermal heating designed by an embodiment 2.
Figure 6:
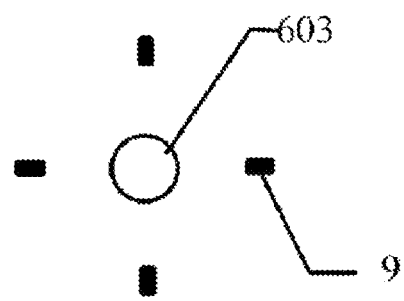
FIG. 6 is a schematic diagram of a positional relationship between a photothermal heating component and a magnetic suspension float in the magnetic suspension thermobalance in FIG. 5.
Figure 7:
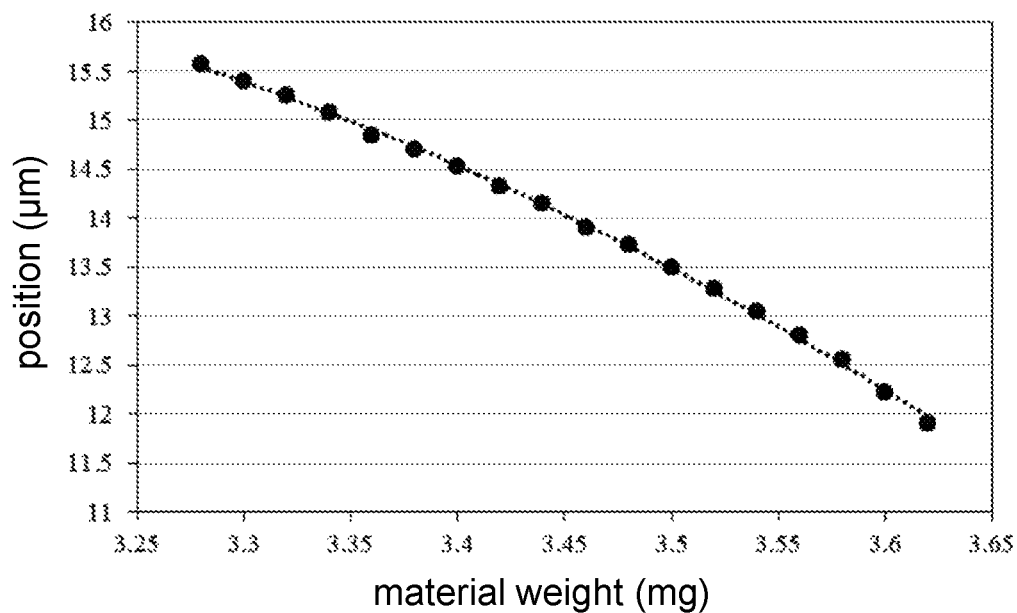
FIG. 7 is a curve diagram drawn and obtained according to data in Table 1.

As shown in FIG. 5, the structures of embodiment 2 and the embodiment 1 are substantially identical, and differences therebetween merely include the following. 1) A microscope 13 and Raman laser 14 are disposed at a lower center portion of the air flow stabilization device 3 in embodiment 2. 2) The specific stator lifting and lowering component 8 is not provided in embodiment 2, and a position of a stator is manually adjusted through a clamping tool. 3) The numbers of the photothermal heating components 9, the heating beam windows 101, the laser displacement monitoring components 10, and the displacement monitoring windows 102 all are 4, and the photothermal heating components 9, the heating beam windows 101, the laser displacement monitoring components 10, and the displacement monitoring windows 102 respectively surround around the magnetic suspension float 603 in an array. FIG. 6 shows the positional relationship between the photothermal heating components 9 and the magnetic suspension float 603 in a top view. 4) In this embodiment, the SMART SENSOR AT1350 is adopted for the infrared temperature measurement component 5, the SICK OD VALUE is adopted for the laser displacement monitoring component 10, and the USHIO JCR 15V150W is adopted for the heating light source 901.

Embodiment 3

The present embodiment discloses a method of measurement of a mass change of a testing sample under a temperature control condition implemented through the magnetic suspension thermobalance provided in embodiment 1 or in embodiment 2 (the two structures may be optionally selected), and the steps are provided as follows.

1) A testing sample having a mass of $g_0$ is weighed and added into the reaction tank 601.

2) The cover plate 12 is removed, and the reaction tank 601 is placed on the support stand 602 of the magnetic suspension float 603. The magnetic suspension float 603 is placed on a center of the cover plate 12, and the cover plate 12 is installed onto the sealed container 1. A position of the magnetic suspension stator 7 is adjusted to be located directly below the center of the cover plate 12 after the cover plate 12 is installed.

3) The magnetic suspension device 6 is activated, and the magnetic suspension stator 7 is moved upwards after a magnetic field stabilizes, so that the magnetic suspension float 603 floats in the sealed container 1.

4) Gas required to maintain a reaction atmosphere is continuously introduced into the sealed container 1. The gas enters from the gas inlet 2 and exits from the gas outlets 11, and a velocity of flow of the gas is controlled to be a velocity of flow v required by an experiment.

5) The laser displacement monitoring component 10 is activated. The monitoring laser beam emitted by the laser displacement monitoring component 10 passes through the displacement monitoring window 102 and irradiates the measurement position of the magnetic suspension float 603. A real-time position of the magnetic suspension float 603 in the sealed container 1 is measured in real time. The position of the magnetic suspension stator 7 is adjusted up and down to cause the magnetic suspension float 603 to float to a measurement zero point position of the laser displacement monitoring component 10.

6) The photothermal heating component 9 is activated. The heating beam emitted by the heating light source 901 of the photothermal heating component 9 passes through the heating beam window 101, focuses on the reaction tank 601, and heats the reaction tank 601.

7) The mass change of the testing sample causes the magnetic suspension float 603 to displace in a temperature control process. Displacement is measured by the laser displacement monitoring component 10 in real time. A position of the photothermal heating component 9 is adjusted in real time by the photothermal heating component displacement device 903 according to the displacement, and the heating beam is kept on the reaction tank 601 all the time.

8) A real-time temperature of the testing sample in the reaction tank 601 is measured through the infrared temperature measurement component 5. Heating power of the heating light source 901 is adjusted according to the measured real-time temperature, and precise temperature control of the testing sample is implemented.

9) Displacement of the magnetic suspension float 603 relative to the measurement zero point is recorded in the temperature control process, and corresponding mass is obtained according to the converted displacement. The displacement is converted into mass through a comparative experiment in this embodiment, and the steps are briefly described as follows.

9.1) A plurality of mass values close to the initial mass of $g_0$ are evenly selected. Herein, a maximum mass value is greater than or equal to a maximum value of the mass of the testing sample in the temperature control process, and a minimum mass value is less than or equal to a minimum value of the mass of the testing sample in the temperature control process.

9.2) A comparative sample having mass of $g_t$ is weighed and added into the reaction tank 601 to perform the comparative experiment for each of mass values $g_t$. Various parameters of the magnetic suspension device 6 are kept to be identical to that in an experiment performed for the testing sample. The velocity of flow v of the gas and the position of the magnetic suspension stator 7 are adjusted to be identical to that in the experiment performed for the testing sample. The photothermal heating component 9 is not activated, and the displacement $x_t$ corresponding to the mass $g_t$ is recorded.

9.3) Each of the obtained mass values is experimented according to the foregoing steps, a data table of displacement $x_t$ and the mass $g_t$ is obtained, and a $x_t$-$g_t$ curve is drawn. Curve fitting is performed, and an equation of $g_t$ and $x_t$ is obtained.

9.4) A point of the displacement obtained through measurement is identified on the $x_t$-$g_t$ curve when the testing sample is experimented, or calculation may be performed according to the equation obtained through curve fitting, and that the corresponding mass is obtained.

The comparative experiment is briefly described above, and the specific operation may be found with reference to step 1) to step 5).

10) The real-time temperature of the testing sample in the temperature control process is recorded and corresponded with the mass calculated and obtained in real time in step 9). A curve of the mass of the testing sample and a temperature is drawn to perform a thermal gravimetric analysis.

11) The magnetic suspension stator 7 is moved downwards to cause the magnetic suspension float 603 to slowly descend onto the cover plate 12 after the reaction tank 601 is cooled down after the measurement is completed. A system power source is turned off, the cover plate 12 is opened, and the reaction tank 601 is removed.

Embodiment 4

The present embodiment discloses a method of adopting a plurality of groups of comparative experiments to build a data base, and specific steps are provided as follows.

1) A range of mass of the thermobalance is determined according to experimental needs. Within this range, the initial mass $g_0$ is selected equidistantly, and values ranging from a minimum value to a maximum value sequentially are $g_{01}, \ldots, g_{0i}, \ldots,$ and $g_{0m}$, where i is an integer and $1 < i < m$.

2) A range of velocity of flow of gas is determined according to experimental needs. Within this range, the calibrated velocity of flow v is selected equidistantly, and values ranging from a minimum value to a maximum value sequentially are $v_1, v_j, \ldots,$ and $v_n$, where j is an integer and $1 < j < n$.

3) One group of $v_j$ and $g_{0i}$ is selected, and a testing sample having a mass of $g_{0i}$ is weighed by another analytical balance and is added into the reaction tank. The reaction tank is then placed inside the thermobalance. The position of the magnetic suspension stator is adjusted to cause the magnetic suspension float to float. The velocity of flow of gas is adjusted to $v_j$. The position of the magnetic suspension stator is adjusted again to cause the magnetic suspension float to be located on the measurement zero point position. Gas supply is stopped, and the reaction tank is removed.

4) Calibrated mass dg is equidistantly increased or decreased (the lower the selected value, the greater the precision), so that the mass $g_{ik}=g_{0i}+k \cdot dg$ of the testing sample, and k is an integer other than zero. If a positive integer is selected, it means that the calibrated mass increases, and if a negative integer is selected, it means that the calibrated mass decreases. The testing sample having the mass of $g_{ik}$ is weighed by the analytical balance and added into the reaction tank, and the reaction tank is then placed inside the thermobalance. The position of the magnetic suspension stator is adjusted to the same position as in step 3), and the velocity of flow of gas is adjusted to the same velocity of flow $v_j$ in step 3). The displacement at this moment is recorded to be $x_{ik}$ after stabilization is reached. Gas supply is stopped, and the reaction tank is removed. Different i values are selected, and that a corresponding data base of $g_t$ and $x_t$ when $g_0=g_{0i}$ may be obtained.

5) All points in a set of $\{g_{01}, \ldots, g_{0i}, \ldots, g_{0m}\}$ are selected for $g_{0i}$, and steps 3) and 4) are repeated.

6) All points in a set of $\{v_1, \ldots, v_j, \ldots, v_n\}$ are selected for $V_j$, steps 3) to 5) are repeated, and that a data base formed by the v, $g_0$, $x_t$, and $g_t$ is obtained.

The following table is a data base table when the velocity of flow of gas is 0.01 m/min and the initial mass is 3.6 mg in the data base:

TABLE 1

$x_t$ and $g_t$ Data Base Table

| mass (mg) | displacement (μm) | | | | |
|---|---|---|---|---|---|
| | test point 1 | test point 2 | test point 3 | test point 4 | average position |
| 3.28 | 15.5 | 15.6 | 15.6 | 15.6 | 15.575 |
| 3.3 | 15.4 | 15.3 | 15.5 | 15.4 | 15.4 |
| 3.32 | 15.2 | 15.1 | 15.4 | 15.3 | 15.25 |
| 3.34 | 15 | 15 | 15.2 | 15.1 | 15.075 |

TABLE 1-continued $x_t$ and $g_t$ Data Base Table

| mass (mg) | displacement (μm) | | | | |
|---|---|---|---|---|---|
| | test point 1 | test point 2 | test point 3 | test point 4 | average position |
| 3.36 | 14.6 | 15 | 14.9 | 14.9 | 14.85 |
| 3.38 | 14.7 | 14.9 | 14.5 | 14.7 | 14.7 |
| 3.4 | 14.7 | 14.5 | 14.5 | 14.4 | 14.525 |
| 3.42 | 14.3 | 14.3 | 14.4 | 14.3 | 14.325 |
| 3.44 | 14.2 | 14.2 | 14.2 | 14 | 14.15 |
| 3.46 | 13.9 | 13.9 | 13.9 | 13.9 | 13.9 |
| 3.48 | 13.7 | 13.8 | 13.7 | 13.7 | 13.725 |
| 3.5 | 13.5 | 13.5 | 13.5 | 13.5 | 13.5 |
| 3.52 | 13.4 | 13.3 | 13.2 | 13.2 | 13.275 |
| 3.54 | 13 | 12.9 | 13.2 | 13.1 | 13.05 |
| 3.56 | 12.7 | 12.8 | 12.8 | 12.9 | 12.8 |
| 3.58 | 12.5 | 12.6 | 12.5 | 12.6 | 12.55 |
| 3.6 | 12.3 | 12.2 | 12.3 | 12.1 | 12.225 |
| 3.62 | 11.9 | 11.9 | 11.9 | 11.9 | 11.9 |

Owing to space limitation, pieces of data related to other velocities of flow of gas and initial mass in the data base are not listed one by one, and only data required by embodiment 5 is listed in Table 1.

Embodiment 5

The data base established in embodiment 4 is adopted by this embodiment, and the specific displacement measured through the experiment is converted into mass.

v=0.01 m/min and $g_0$=3.6 mg are selected. A comparative data table of the corresponding $x_t$ and $g_t$ is identified in the data base (see Table 1). In the table, the average position $x_t$ acts as the vertical coordinate, and the mass $g_t$ acts as the horizontal coordinate, and that a curve is drawn. With reference to 7 for detail, $x_t=-9.7555g_t^2+56.809g_t-65.838$ is obtained through curve fitting, and a variance $R^2=0.9992$.

A process of heating spectra graphite to 1,000° C. in an air atmosphere according to the steps of embodiment 3 is measured, and displacements of different times are obtained. Corresponding mass is obtained through conversion according to a curve fitting equation and is listed in the table below.

TABLE 2

Data of Positions of Spectra Graphite Along With Heating Time

| time (s) | position (μm) | mass (mg) |
|---|---|---|
| 0 | 12.3 | 3.60 |
| 5 | 12.3 | 3.59 |
| 10 | 12.3 | 3.60 |
| 15 | 12.3 | 3.60 |
| 20 | 12.2 | 3.60 |
| 25 | 12.3 | 3.60 |
| 30 | 12.3 | 3.59 |
| 35 | 12.6 | 3.57 |
| 40 | 12.8 | 3.56 |
| 45 | 13.0 | 3.54 |
| 50 | 13.2 | 3.53 |
| 55 | 13.3 | 3.51 |
| 60 | 13.6 | 3.49 |
| 65 | 13.8 | 3.47 |
| 70 | 14.0 | 3.46 |
| 75 | 14.2 | 3.44 |
| 80 | 14.3 | 3.43 |
| 85 | 14.5 | 3.41 |
| 90 | 14.6 | 3.39 |
| 95 | 14.8 | 3.38 |
| 100 | 14.9 | 3.36 |
| 105 | 15.0 | 3.35 |

TABLE 2-continued

Data of Positions of Spectra Graphite Along With Heating Time

| time (s) | position (μm) | mass (mg) |
|---|---|---|
| 110 | 15.2 | 3.33 |
| 115 | 15.4 | 3.30 |
| 120 | 15.4 | 3.30 |
| 125 | 15.6 | 3.28 |

Results of measurement showing the relationship between a mass change and time in the heating process of graphite through a conventional thermobalance when conditions of the velocity of flow, initial mass, and heating curve are the same are listed in Table 3 below.

TABLE 3

Conventional Thermobalance Experimental Data of Graphite Weightlessness

| time (s) | mass (mg) |
|---|---|
| 0(30) | 3.6 |
| 15(45) | 3.5489 |
| 30(60) | 3.492 |
| 45(75) | 3.4529 |
| 60(90) | 3.3971 |
| 75(105) | 3.3569 |

Figure 8:
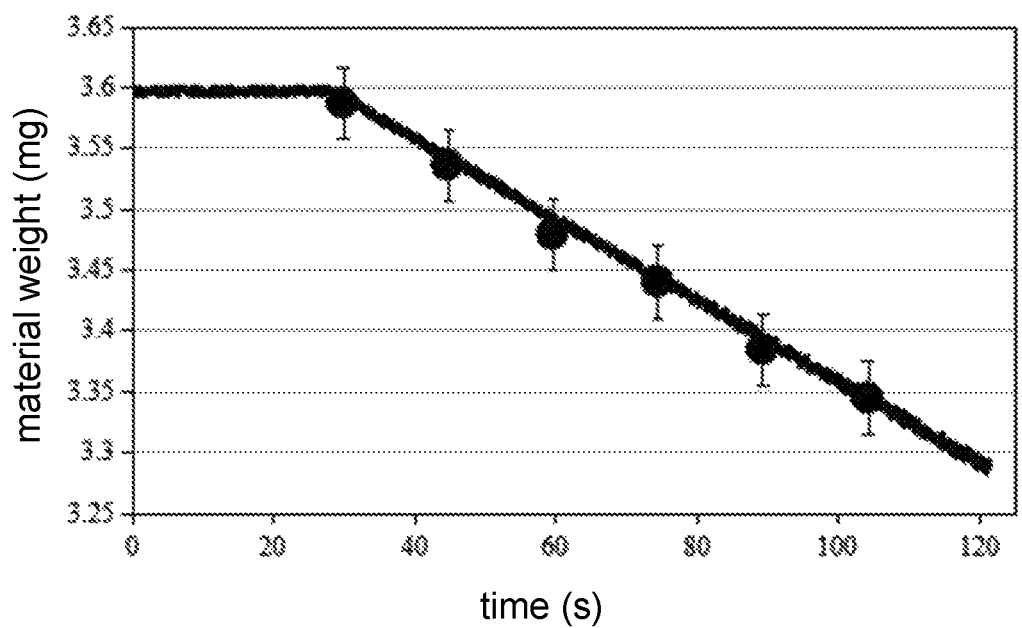
FIG. 8 is a curve diagram drawn and obtained according to data in Table 2 and Table 3.

Table 2 and Table 3 may be drawn into the same coordinate map, and FIG. 8 is thereby obtained. Herein, the solid line is the data curve fitting curve in Table 2, and the dots are the data in Table 3. As shown in FIG. 8, the test results provided by the disclosure are preferably matched with the conventional analysis method.

Note that the thermal gravimetric analysis may be favorably implemented through the disclosure, but the thermal gravimetric analysis shall not be viewed as a limitation to the purpose of the disclosure. Measurement of other scenarios, such as in situ reaction monitoring, of mass changes of a testing sample in a temperature control process (temperature increasing or temperature decreasing) may also be implemented through the disclosure.

What is claimed is:

1. A magnetic suspension thermobalance based on photothermal heating, the magnetic suspension thermobalance comprising:

a sealed container, a reaction tank, a magnetic suspension device, a laser displacement monitoring component, a photothermal heating component and a photothermal heating component displacement device, wherein a gas inlet is disposed on an upper end of the sealed container, a removable cover plate is disposed on a lower end of the sealed container, a gas outlet is disposed on the cover plate, an air flow stabilization device and an infrared temperature measurement component are disposed inside the sealed container, a displacement monitoring window and a heating beam window both made of a transparent material are disposed in a side wall of the sealed container, the air flow stabilization device is fixed below the gas inlet, the infrared temperature measurement component is fixed below the air flow stabilization device, the photothermal heating component and the laser displacement monitoring component are disposed around the sealed container, the photothermal heating component is connected to the photothermal heating component displacement device and is displaceable through the photothermal heating component displacement device, the magnetic suspension device comprises a magnetic suspension float and a magnetic suspension stator, a support stand configured to support the reaction tank is fixedly disposed on an upper portion of the magnetic suspension float, and when measurement is performed, the magnetic suspension stator is located below the cover plate, the reaction tank is placed on the support stand and is placed in the sealed container together with the magnetic suspension float, and the reaction tank, the magnetic suspension float, and the magnetic suspension stator are on a same center axis, the infrared temperature measurement component faces an opening on an upper portion of the reaction tank, a heating beam emitted by the photothermal heating component passes through the heating beam window and focuses on the reaction tank, a monitoring laser beam emitted by the laser displacement monitoring component passes through the displacement monitoring window and irradiates a measurement position of the magnetic suspension float.

2. The magnetic suspension thermobalance based on photothermal heating as claimed in claim 1, wherein the magnetic suspension thermobalance further comprises a stator lifting and lowering component configured to lift or lower the magnetic suspension stator, and an upper portion of the stator lifting and lowering component is fixedly connected to a lower portion of the magnetic suspension stator.

3. The magnetic suspension thermobalance based on photothermal heating as claimed in claim 2, wherein the stator lifting and lowering component comprises an electric machine and a screw pair, one end of the screw pair performing a rotation motion is fixedly connected to an output axis of the electric machine, and another end of the screw pair performing a linear motion is fixedly connected to the lower end of the magnetic suspension stator.

4. The magnetic suspension thermobalance based on photothermal heating as claimed in claim 1, wherein a balancer is disposed outside the magnetic suspension float, an upper portion of the balancer is fixedly connected to the support stand, the upper portion of the magnetic suspension float is embedded inside the balancer from bottom to top, and at least two balancing wings are symmetrically disposed on a center of the balancer.

5. The magnetic suspension thermobalance based on photothermal heating as claimed in claim 4, wherein a black silicon carbide ceramic cylindrical crucible is adopted for the reaction tank, and a lightweight insulating brick material is adopted to make the support stand and the balancer.

6. The magnetic suspension thermobalance based on photothermal heating according to claim 1, wherein a number of the photothermal heating component is plural, the photothermal heating components surround the center axis of the reaction tank and are disposed in an array outside the sealed container, and a size and a number of the heating beam window are determined to ensure that each of the photothermal heating components normally irradiates the reaction tank in a measurement process.

7. The magnetic suspension thermobalance based on photothermal heating according to claim 1, wherein a number of the laser displacement monitoring component is plural, the laser displacement monitoring components are disposed around the center axis of the reaction tank in an array outside the sealed container, and a size and a number of the displacement monitoring window are determined to ensure that each of the laser displacement monitoring components normally irradiates the measurement position of the magnetic suspension float in a measurement process.

8. The magnetic suspension thermobalance based on photothermal heating according to claim 1, wherein the sealed container is cylindrical-shaped, and the reaction tank, the magnetic suspension float, and the magnetic suspension stator are all located on a center axis of the sealed container when measurement is performed.

9. The magnetic suspension thermobalance based on photothermal heating according to claim 1, wherein a precision robotic arm is adopted for the photothermal heating component displacement device.

10. The magnetic suspension thermobalance based on photothermal heating according to claim 1, wherein one or more of a pressure monitoring component, a microscope, and a Raman laser are further disposed in the sealed container.

11. A measurement method of a magnetic suspension b thermobalance based on photothermal heating, wherein the method adopts the magnetic suspension thermobalance as claimed in claim 1 to measure a mass change of a testing sample under a temperature control condition and the method comprises following steps:
1) weighing the testing sample having a mass of $g_0$ and adding the same into the reaction tank;
2) removing the cover plate, placing the reaction tank on the support stand of the magnetic suspension float, placing the magnetic suspension float on a center of the cover plate, installing the cover plate onto the sealed container, adjusting a position of the magnetic suspension stator to be located directly below the center of the installed cover plate;
3) activating the magnetic suspension device, moving the magnetic suspension stator upwards after a magnetic field stabilizes, so that the magnetic suspension float floats in the sealed container;
4) continuously introducing gas required to maintain a reaction atmosphere into the sealed container, the gas entering from the gas inlet and exiting from the gas outlet, a velocity of flow of the gas being controlled to be a velocity of flow v required by an experiment;
5) activating the laser displacement monitoring component, the monitoring laser beam emitted by the laser displacement monitoring component passing through the displacement monitoring window and irradiating the measurement position of the magnetic suspension float, measuring a real-time position of the magnetic suspension float in the sealed container, adjusting the position of the magnetic suspension stator up and down, causing the magnetic suspension float to float to a measurement zero point position of the laser displacement monitoring component;
6) activating the photothermal heating component, the heating beam emitted by a heating light source of the photothermal heating component passing through the heating beam window, focusing on the reaction tank, and heating the reaction tank;
7) causing the magnetic suspension float to displace by the mass change of the testing sample in a temperature control process, measuring displacement by the laser displacement monitoring component in real time, adjusting a position of the photothermal heating component in real time by the photothermal heating component displacement device according to the displacement, keeping the heating beam on the reaction tank all the time;
8) measuring a real-time temperature of the testing sample in the reaction tank through the infrared temperature measurement component, adjusting heating power of a heating light source according to the measured real-time temperature, implementing precise temperature control of the testing sample; and
9) recording displacement of the magnetic suspension float relative to the measurement zero point in the temperature control process, obtaining corresponding mass according to the converted displacement.

12. The measurement method of the magnetic suspension b thermobalance based on photothermal heating as claimed in claim 11, wherein in step 9), the displacement measured in the experiment is converted into mass through a comparative experiment, and the comparative experiment comprises following steps:
9.1) evenly selecting a plurality of mass values close to the mass of $g_0$, wherein a maximum mass value is greater than or equal to a maximum value of the mass of the testing sample in the temperature control process, and a minimum mass value is less than or equal to a minimum value of the mass of the testing sample in the temperature control process;
9.2) weighing and adding a comparative sample having mass of $g_t$ into the reaction tank to perform the comparative experiment for each of mass values $g_t$, keeping various parameters of the magnetic suspension device to be identical to that in an experiment performed for the testing sample, adjusting the velocity of flow v of the gas and the position of the magnetic suspension stator to be identical to that in the experiment performed for the testing sample, not activating the photothermal heating component, recording displacement $x_t$ corresponding to the mass $g_t$;
9.3) experimenting on each of the obtained mass values according to the foregoing steps, obtaining a data table of displacement $x_t$ and mass $g_t$, drawing a $x_t$-$g_t$ curve; and
9.4) identifying a point of the displacement obtained through measurement on the $x_t$-$g_t$ curve when the testing sample is experimented, and that the corresponding mass is obtained.

13. The measurement method of the magnetic suspension b thermobalance based on photothermal heating as claimed in claim 12, wherein the step 9.4) comprises performing curve fitting to the $x_t$-$g_t$ curve, obtaining an equation of $g_t$ and $x_t$, and substituting the displacement obtained through measurement into the equation when the testing sample is tested, and that the corresponding mass is obtained.

14. The measurement method of the magnetic suspension b thermobalance based on photothermal heating as claimed in claim 12, wherein the method further comprises obtaining a plurality of groups of $g_0$ and v for the comparative experiment according to a numerical range required by the experiment; first adjusting the position of magnetic suspension stator and causing the magnetic suspension float to float to the set measurement zero point position for each group of $g_0$ and v, keeping the magnetic suspension stator to be unchanged next, obtaining comparative data of $x_t$ and $g_t$ under a condition of $g_0$ and v according to the steps 9.1) to 9.3); repeatedly performing the comparative experiment, building a data base including four quantities of $g_0$, v, $x_t$, and $g_t$; and selecting one group of $g_0$ and v according to needs when the testing sample is experimented, identifying the comparative data of the corresponding $x_t$ and $g_t$ in the data base, so that displacement is conveniently converted into mass.

15. The measurement method of the magnetic suspension b thermobalance based on photothermal heating according to claim 11, wherein the method further comprises following step: 10) recording the real-time temperature of the testing sample in the temperature control process, and corresponding the real-time temperature of the testing sample with the mass calculated and obtained in real time in step 9), drawing a curve of the mass of the testing sample and a temperature to perform a thermal gravimetric analysis.

16. The measurement method of the magnetic suspension thermobalance based on photothermal heating as claimed in claim 15, wherein the method further comprises following step: 11) moving the magnetic suspension stator downwards and causing the magnetic suspension float to slowly descend onto the cover plate after the reaction tank is cooled down after the measurement is completed, turning off a system power source, opening the cover plate, and removing the reaction tank.

17. The measurement method of the magnetic suspension thermobalance based on photothermal heating according to claim 11, wherein the method further comprises following step: 11) moving the magnetic suspension stator downwards and causing the magnetic suspension float to slowly descend onto the cover plate after the reaction tank is cooled down after the measurement is completed, turning off a system power source, opening the cover plate, and removing out the reaction tank.

* * * * *